Jan. 22, 1957 W. N. KILNER 2,778,959
DYNAMO ELECTRIC MACHINE COOLING
Filed July 15, 1954 2 Sheets-Sheet 1

INVENTOR
William Norman Kilner
By Norris & Bateman
ATTORNEYS

Jan. 22, 1957  W. N. KILNER  2,778,959
DYNAMO ELECTRIC MACHINE COOLING
Filed July 15, 1954  2 Sheets-Sheet 2

INVENTOR
William Norman Kilner
By Morris & Bateman
ATTORNEYS

United States Patent Office 2,778,959
Patented Jan. 22, 1957

2,778,959
DYNAMO ELECTRIC MACHINE COOLING

William Norman Kilner, Hale, England, assignor to Metropolitan-Vickers Electrical Company Limited, London, England, a British company Application July 15, 1954, Serial No. 443,585

Claims priority, application Great Britain July 22, 1953

3 Claims. (Cl. 310—64)

This invention relates to dynamoelectric machines, and has an important application in large size turbo alternators.

It is well known that one of the main factors limiting the output of a large dynamoelectric machine, such as a turbo alternator, is the rise in temperature; this in turn depends upon heat dissipation, the limiting temperature rise being, of course, the temperature rise of an individual part or component.

It is customary to cool machines by promoting a flow of fluid, such as air or hydrogen, over the surfaces of the core and conductors.

According to the present invention the end turns of the rotor conductors, i. e. those parts which project beyond the ends of the core, are provided with radial passages communicating with ports in the side, i. e. the radial faces of the conductors, for the purpose of promoting flows of fluid through the interiors of the conductors.

It will be appreciated that such an arrangement augments the normal cooling in which heat is removed from the conductor surfaces, as it permits removal of additional heat from the interiors of the conductors.

According to one arrangement, radial passages pass through complete coils at intervals, and each communicates with side ports in all the conductors.

Alternatively, each radial passage may feed a side port in a single conductor, successive radial passages feeding side ports in separate conductors so as to provide for uniform cooling. In other arrangements, of course, each radial passage may feed side ports in two or more conductors. The cooling fluid may be air or hydrogen or other suitable gas, and the term includes an easily volatilised liquid such as Freon.

Additional means may be provided for cooling the sections of the conductors which are embedded in the slots. Such means, for instance, comprise longitudinal ducts discharging through radial ports into the gap between the rotor and the stator as, for example, is described in U. S. Serial Nos. 331,208 and 331,209 now Patent Numbers 2,749,457 and 2,724,064, respectively.

In order that the invention may be more clearly understood, reference will now be made to the accompanying drawings, in which—

It will be appreciated that whereas in the example shown there are only four conductors per slot this is purely for simplification as there may be an appreciably greater number of conductors per slot.

Figure 1:
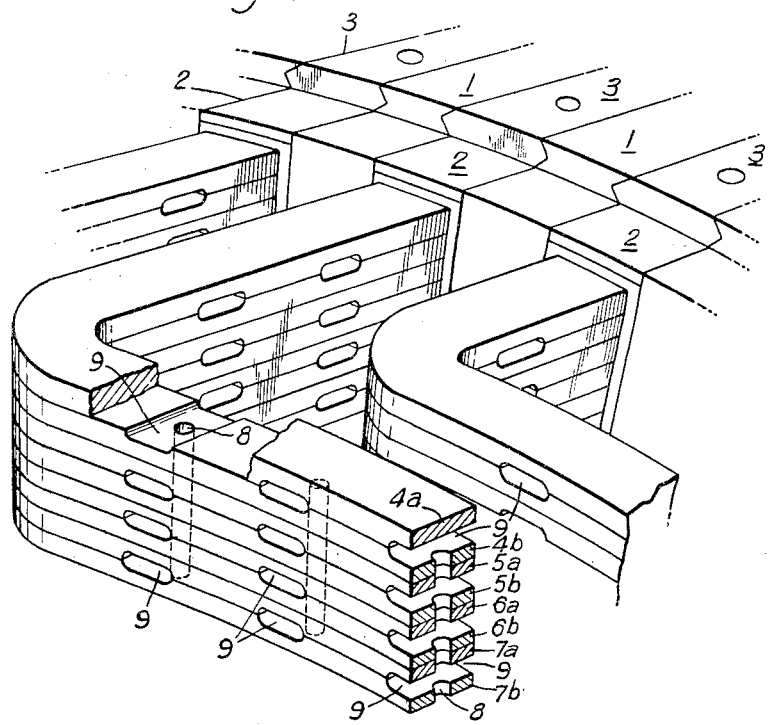
Fig. 1 shows pictorially a portion of the end of the winding of a turbo alternator rotor with the end ring removed so as more clearly to show the conductors.

In Fig. 1 the references 1 indicate the core teeth between adjacent slots which are provided with slot insulation 2, and longitudinal wedges 3, for withstanding the radial thrust of the winding in accordance with normal practice. In the arrangement shown each winding, as above mentioned, comprises four conductors and each conductor is shown as consisting of two strips. Thus the strip forming the first conductor is indicated by the references 4a and 4b, that of the second conductor 5a and 5b, and of the remaining two conductors 6a and 6b, and 7a and 7b respectively. Radial passages 8 are formed through all the turns of each winding and in each conductor these are provided with lateral discharge ports 9.

Thus it will be appreciated that with this arrangement gas will pass radially outwards along the passages 8 (i. e. upwards in the drawing), and will discharge through the side ports 9 into the surrounding space. At intervals the passages 8 and ports 9 are suitably spaced apart along the conductors so that packing blocks may be placed between the coils in a manner not to obstruct the passages.

Figure 2:
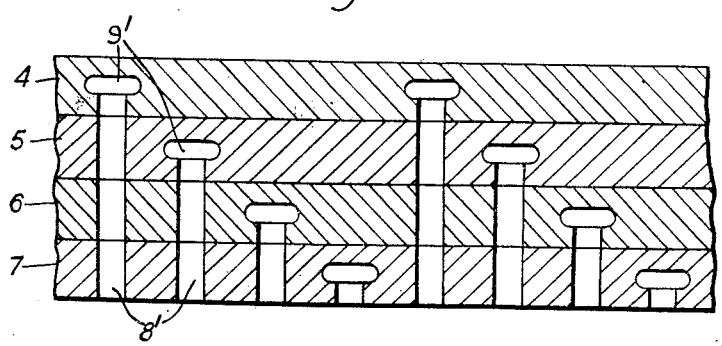
Figs. 2 and 3 are sectional views taken in a radial plane of a portion of the end winding showing alternative arrangements of the passages and ducts.

Fig. 2 shows a modified arrangement in which each radial passage feeds a separate conductor. Thus the left hand passageway feeds a port 9 in the conductor, the next radial passage discharges through a port 9 in the conductor 5, and so on, so that the radial passages discharge through ports in the individual conductors in a recurring section. In this arrangement the four conductors are shown as formed of single strips of copper, but obviously they may be formed of two strips of copper, as shown in the arrangement of Fig. 1, or even of a greater number of strips superimposed.

Figure 3:
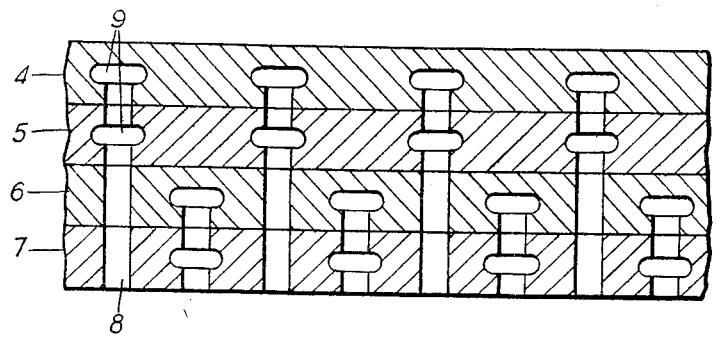

Fig. 3 shows an alternative arrangement in which the left hand passage 8 discharges through ports 9 in both conductors 4 and 5, whilst the next passage 8 discharges through ports in both conductors 6 and 7. Thus alternate passages discharge through the two outer (i. e. top in the drawing) conductors and the intervening passages discharge through the two conductors. Obviously more than two conductors can be fed from a single radial passage.

In all cases the top strip 4a is made solid so that portions 8a blank off the outer ends of the passages 8 and prevent them discharging other than through the side ports.

Figure 4:
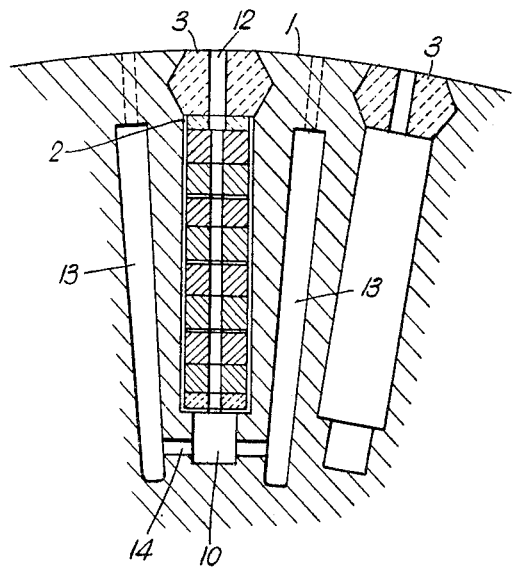
Fig. 4 is a transverse section through a core slot showing the cooling arrangements for the conductors embedded in the slots.

Fig. 4 shows one arrangement for cooling the conductors embedded in the slots and the slot teeth which may be employed in conjunction with the end turn cooling arrangement described above.

Axial ducts 10 extend beneath the winding slots 11 and discharge through radial passages 12 extending through the conductors in the slot to the rotor periphery. Additional axial ducts 13 in the core teeth may be provided to feed the ducts 10 through ports 14. With such an arrangement gas discharged from the ports 9 or 9′ as the case may be, will enter the ends of the ducts 10 and 13 and discharge through the passages 12. The ports 14 are preferably provided along the mid-part of the core to augment the supply of cooling gas to the passages 12.

Alternatively or in addition, the ducts 13 may discharge direct to the periphery of the rotor through passages indicated in dotted lines.

What I claim is:

1. A high speed dynamoelectric machine having a stator and a rotor having a core provided with slots, windings to said rotor including conductors arranged in the slots in the core, end turns to said windings projecting beyond the ends of the core, cooling gas passages spaced apart in said end turns and extending radially outwards from the inner surfaces of the windings, discharge passages extending laterally across said radial cooling gas passages and terminating in edges defining discharge ports in each side surface of said end turns, and means for preventing gas discharging through the outer surfaces of the windings.

2. A high speed dynamoelectric machine having a stator and a rotor having a core provided with slots, windings to said rotor including conductors arranged in the slots in the core, end turns to said windings projecting beyond the ends of the core, cooling gas passages spaced apart in said end turns and extending radially outwards from the inner surfaces of the windings, a series of lateral discharge passages arranged to intersect each radial cooling gas passage and terminate in edges defining discharge ports in each side surface of a conductor, the arrangement such that a lateral passage passes through each conductor of a winding.

3. A high speed dynamoelectric machine having a stator and a rotor having a core provided with slots, windings to said rotor including conductors arranged in the slots in the core, end turns to said windings projecting beyond the ends of the core, cooling gas passages spaced apart in said end turns and extending radially outwards from the inner surfaces of the windings, a series of lateral discharge passages each located in different conductors in said end turns in a recurring sequence, said lateral passages extending across the windings and terminating in edges defining discharge ports, and each of said radial cooling passages extending as far as and being terminated by one of said lateral passages.

References Cited in the file of this patent

UNITED STATES PATENTS

| | | |
|---|---|---|
| 2,653,255 | Baudry | Sept. 22, 1953 |
| 2,664,512 | Huntley | Dec. 29, 1953 |